May 1, 1928.

A. THOMAS 1,668,130

DRIVE AND CONTROL OF MOTOR GENERATORS

Filed May 17 1927

Patented May 1, 1928.

1,668,130

UNITED STATES PATENT OFFICE.

ARTHUR THOMAS, OF CALGARY, ALBERTA, CANADA.

DRIVE AND CONTROL OF MOTOR GENERATORS.

Application filed May 17, 1927. Serial No. 192,056.

My invention relates to improvements in the drive and control of motor generators particularly applied to railway carriages, though it may be applied to other purposes with the exercise of only mechanical skill. It is well known that in applying motor generators to railway carriages great difficulty has been encountered in devising a geared connection, which has many advantages over a belt drive system. Due to the momentum of the generator armature driven at high speed, great stresses are thrown on the gearing system of the drive when the train is quickly brought to a stop, or even when the brakes are suddenly applied.

The objects of my invention are, first, to provide a gear drive for the motor generator; second, to provide a means of disconnecting the generator when the brakes are applied to stop the train; and third, to bring the generator armature to rest quickly after the gear drive has been disconnected.

I attain these objects by the mechanism illustrated in the accompanying drawings, in which—

Similar numerals refer to similar parts throughout the several views.

Figure 1:
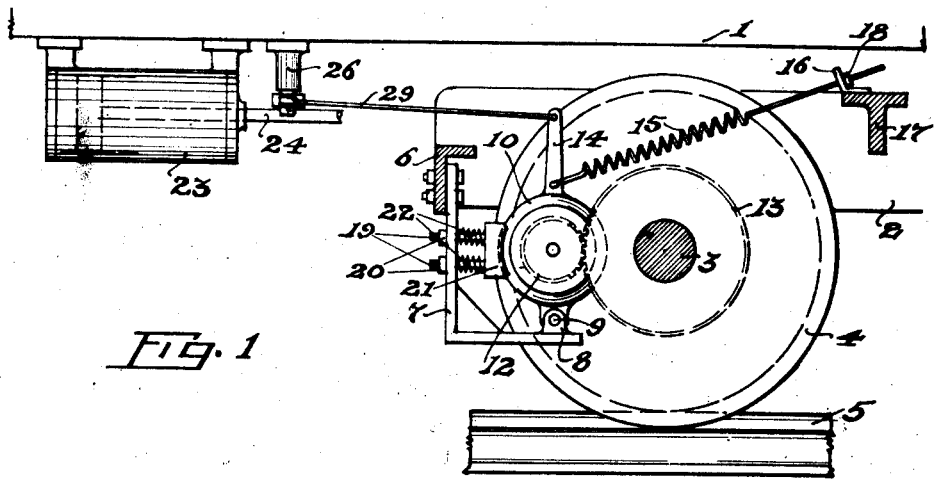
Fig. 1 is a vertical section showing the complete device.
Figure 2:
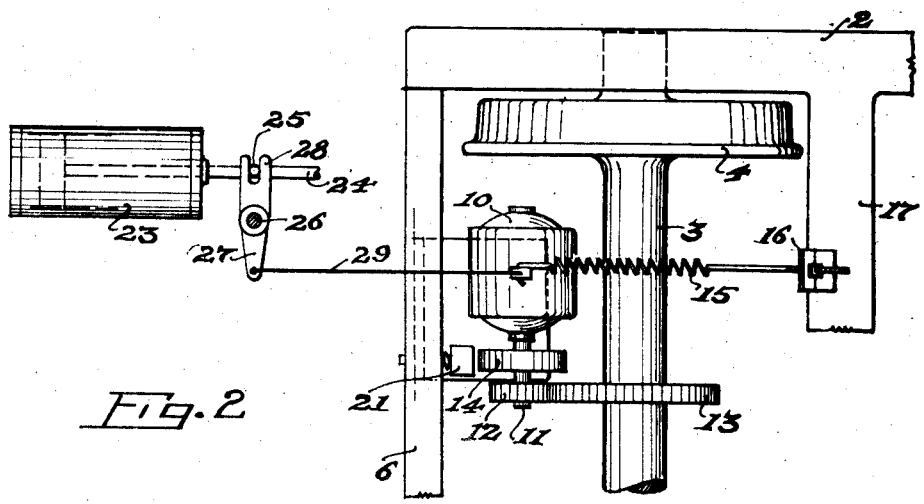
Fig. 2 is a plan of the device.

1 is the underside of the chassis of a railway carriage from which is supported in suitable relation the truck 2. The truck 2 which is of widely variable design carries the main wheel axles 3 upon which are carried the wheels 4. The wheels 4 rest on the rails 5. A suitable part of the truck frame 6 is utilized to support the bracket 7 upon which are formed the lugs 8. In these lugs 8 is carried the pivotal pin 9 upon which is pivotally mounted the motor generator 10. The shaft 11 of the generator 10 has keyed thereon the driven pinion 12 which meshes under control with the driving pinion 13 carried on the main wheel axle 3. Formed on the generator casing is a lever arm 14 to which is attached a tension spring 15. The opposite end of the tension spring 15 passes through a lug 16 mounted on a convenient part 17 of the truck 2. The tension of the spring 15 is adjusted by the nut 18. Supported by the bracket 7 before mentioned are the guide rods 19 supporting a brake block 21. Compression springs 22 are inserted between the bracket 7 and the brake block the action of the springs being controlled by the adjusting nuts 20. The brake pulley 14 keyed to the shaft 11 of the generator 10 comes into contact with the brake block 21 when the generator is thrown into disengaged position.

Carried by the carriage chassis 1 is the air brake cylinder 23 having a piston rod 24 upon which is mounted a projecting pin 25. Also supported by the chassis 1 is the bracket 26 in relation to the air brake cylinder 23 upon which bracket is pivotally supported the lever 27 having its end 28 slotted for engagement with the pin 25. The other end of lever 27 is connected to the arm 14 of the generator 10 by the cable 29.

In operation the driven pinion on the generator shaft is normally in mesh with the driving pinion 13 on the axle of the carriage wheels and when the carriage is in motion the generator is driven, thereby supplying electric current for lights or storage. In bringing the carriage to rest the air brake is used in which operation the piston rod 24 moves outwards from the air cylinder thereby actuating the lever 27 which in turn pulls the cable 29 and disengages the generator drive. In swinging from engaged to disengaged position the brake pulley 14 comes into contact with the brake shoe 21 and the armature of the generator is quickly brought to rest.

What I claim is:

1. The combination in a generator drive and control of a shaft providing a source of power having a pinion thereon, a generator pivotally supported in relation to the power shaft, a pinion on the generator shaft adapted to engage with the pinion on the said power shaft, spring means influencing the said pinions to engagement, control means comprising a cable intermediate the generator and a reciprocating part of adjacent machinery coordinating the motion of the generator on its pivotal support and the actuation of the adjacent machinery.

2. The combination in a generator drive and control of a shaft providing a source of power, a generator pivotally supported in relation thereto having a pinion on the shaft thereof, a pinion on the said power shaft adapted to mesh with the pinion on the generator shaft, spring means influencing the said pinions to engagement, a cable intermediate the generator and an adjacent pivoted lever arm adapted to swing the generator on its pivotal support when the lever is actuated.

3. The combination in a generator drive and control, comprising a shaft providing a source of power having a pinion thereon, a generator pivotally supported in relation to the power shaft, a pinion on the said generator shaft adapted to mesh with the pinion on the power shaft, spring means influencing the said pinions to engagement, a drive control comprising a link intermediate the generator and a lever actuated by an air brake, the said link disengaging the drive when the air brake is applied.

4. The combination in a generator drive and control, comprising a shaft providing a source of power and having a pinion thereon, a generator pivotally supported in relation thereto, a pinion on the said generator shaft adapted to mesh with the pinion on the power shaft, a spring influencing the pinions to engagement, control means comprising a cable intermediate the generator and an exterior air brake mechanism, the said control disengaging the drive when the air brake is applied, and a brake shoe yieldably supported in relation to a brake pulley on the said generator shaft engaging when the generator drive is disconnected.

ARTHUR THOMAS.